US011372833B2

United States Patent
McKeon (10) Patent No.: US 11,372,833 B2
(45) Date of Patent: Jun. 28, 2022

(54) DATA PROCESSING ARRANGEMENT AND METHOD

(71) Applicant: CLEAR HORIZON IS LIMITED, Leek (GB)

(72) Inventor: Paul McKeon, Leek (GB)

(73) Assignee: CLEAR HORIZON IS LIMITED, Leek (GB)

( * ) Notice: Subject to any disclaimer, the term of this patent is extended or adjusted under 35 U.S.C. 154(b) by 689 days.

(21) Appl. No.: 16/147,740

(22) Filed: Sep. 29, 2018

(65) Prior Publication Data

US 2019/0102414 A1    Apr. 4, 2019

(30) Foreign Application Priority Data

Sep. 29, 2017 (GB) .................................... 1715915

(51) Int. Cl.
*G06F 16/00* (2019.01)
*G06F 16/22* (2019.01)
(Continued)

(52) U.S. Cl.
CPC ...... *G06F 16/2272* (2019.01); *G06F 9/44505* (2013.01); *G06F 9/543* (2013.01);
(Continued)

(58) Field of Classification Search
CPC .. G06F 16/2272; G06F 9/44505; G06F 9/543; G06Q 50/06; H02J 3/00; H02J 2203/20; Y04S 40/20
See application file for complete search history.

(56) References Cited

U.S. PATENT DOCUMENTS

| 5,566,069 A | 10/1996 | Clark, Jr. et al. |
| 5,752,244 A * | 5/1998 | Rose ....................... G06F 16/40 |
| | | 707/999.005 |

(Continued)

FOREIGN PATENT DOCUMENTS

| CN | 2598051 | 1/2004 |
| CN | 103744771 | 4/2014 |

OTHER PUBLICATIONS http://www.iformbuilder.com/features/flexible-formbuilder, pp. 1-5.
(Continued)

*Primary Examiner* — Diedra McQuitery
(74) *Attorney, Agent, or Firm* — Liu & Liu (57) ABSTRACT

The present invention relates to a data processing arrangement 10 for collating information relating to distributed inanimate assets 14. The data processing arrangement 10 comprises a portable computing apparatus 16 operable by a user and a remote computing apparatus 12. The data processing arrangement 10 also comprises an application in the portable computing apparatus. The application is operative to control input by the user to the portable computing apparatus 16 of asset information for each of the distributed inanimate assets 14 and to convey the asset information input by the user to the remote computing apparatus 12. The data processing arrangement 10 further comprises a configurable data structure which is operative to determine what asset information is input by the user by way of the application and without the application being changed. The remote computing apparatus 12 is operative to change the configurable data structure from one use of the application to another to thereby change what asset information is input by the application in respect of at least one of the distributed inanimate assets 14.

17 Claims, 3 Drawing Sheets

(51) Int. Cl.
*H02J 3/00* (2006.01)
*G06Q 50/06* (2012.01)
*G06F 9/445* (2018.01)
*G06F 9/54* (2006.01)

(52) U.S. Cl.
CPC ............... *G06Q 50/06* (2013.01); *H02J 3/00* (2013.01); *H02J 2203/20* (2020.01)

(56) References Cited

U.S. PATENT DOCUMENTS

| | | | |
|---|---|---|---|
| 5,864,784 A | 1/1999 | Brayton et al. | |
| 6,512,463 B1* | 1/2003 | Campbell | H04Q 9/04 |
| | | | 726/19 |
| 7,194,512 B1 | 3/2007 | Creemer et al. | |
| 7,216,108 B2* | 5/2007 | Hastings | G06Q 30/0283 |
| | | | 705/410 |
| 2004/0004555 A1* | 1/2004 | Martin | H04Q 9/00 |
| | | | 340/870.02 |
| 2007/0186150 A1 | 8/2007 | Rao et al. | |
| 2009/0276771 A1 | 11/2009 | Nickolov et al. | |
| 2011/0087601 A1 | 4/2011 | Apte et al. | |
| 2011/0145863 A1* | 6/2011 | Alsina | H04L 67/26 |
| | | | 725/44 |
| 2011/0214067 A1 | 9/2011 | Tanaka | |
| 2013/0304717 A1 | 11/2013 | Goli et al. | |
| 2014/0358306 A1 | 12/2014 | Lee | |
| 2015/0304169 A1 | 10/2015 | Milman et al. | |
| 2015/0309971 A1 | 10/2015 | Cowley et al. | |
| 2016/0124521 A1 | 5/2016 | Hayner | |

OTHER PUBLICATIONS http://pscanner/ucsd.edu/about/architecture, pp. 1-2.
http://www.fulcrumapp.com/tour, pp. 1-8.
Abramson et al., "A Computational Economy for Grid Computing and its Implementation in the Nimrod-G Resource Broker", pp. 1-12.

* cited by examiner

DATA PROCESSING ARRANGEMENT AND METHOD

This application claims priority to GB Application No. 1715915.3, filed on Sep. 29, 2017, the subject matter of which is incorporated herein by reference.

FIELD OF THE INVENTION

The present invention relates to apparatus for and methods of collating information relating to distributed assets and in particular but not exclusively collating information relating to installed assets of an infrastructure, such as are managed by a public utility.

BACKGROUND ART

It is known to collate information relating to distributed installed assets belonging to a public utility such as an electricity generator or supplier, or a water supplier.

An established approach to collating such information involves a person attending the location of each installed asset and recording the requisite information for the installed asset. For example, where the installed asset relates to an electrical distribution substation the requisite information may include the like of the voltage rating, the number of feeders (i.e. output lines), the number of circuit breakers and the condition of the circuit breakers. In a typical arrangement comprising distributed installed assets the nature of the installed asset differs from location to location. This means that different information needs to be recorded for different installed assets. Furthermore, the information to be recorded for a particular installed asset may change over time. For example, more comprehensive information may need to be recorded on an annual basis and less comprehensive information may need to be recorded on a quarterly basis. By way of further example, the configuration of an installed asset may change over time.

More recently computer technology has been used for information collation. Portable computers such as tablet computers have proven useful for information entry by persons attending the location of installed assets. Such a portable computer runs a dedicated application that is operative to control input of information by the user by displaying the like of a series of prompts for input of a corresponding series of different forms of information. When the information for an installed asset has been input the portable computer is typically operative to transmit the recorded information to computer apparatus at a central location for subsequent processing of the recorded information along with information recorded for other installed assets.

The inventors have appreciated that the dedicated application often needs to be tailored for different installed assets. Furthermore, the dedicated application is liable to need tailoring to take account of changes to installed assets or of differing data recordal requirements at different times of the year. Tailoring of the dedicated application involves extensive rebuilding of the dedicated application. Furthermore, the rebuilt dedicated application needs to be deployed and personnel need to be retrained to provide for proper use of the rebuilt dedicated application. Such tasks impose a considerable burden on capital and operational expenditure.

The present invention has been devised in light of appreciation of these problems. It is therefore an object for the present invention to provide an improved data processing arrangement for collating information relating to distributed assets. It is a further object for the present invention to provide an improved method of collating information relating to distributed assets.

STATEMENT OF INVENTION

According to a first aspect of the present invention there is provided a data processing arrangement for collating information relating to distributed inanimate assets, the data processing arrangement comprising:
  portable computing apparatus operable by a user;
  remote computing apparatus;
  an application in the portable computing apparatus, the application being operative: to control input by the user to the portable computing apparatus of asset information for each of the distributed inanimate assets; and to convey the asset information input by the user to the remote computing apparatus; and
  a configurable data structure which is operative to determine what asset information is input by the user by way of the application and without the application being changed,
  the remote computing apparatus being operative to change the configurable data structure from one use of the application to another to thereby change what asset information is input by the application in respect of at least one of the distributed inanimate assets.

The invention relates to a data processing arrangement for collating data relating to distributed inanimate assets, such as assets installed at distributed locations. The data processing arrangement comprises portable computing apparatus, such as a tablet computer, which is operable by a user and remote computing apparatus, such as a server operated by an owner of the distributed inanimate assets or an intermediate organisation having responsibility for collation of data for the owner. The data processing arrangement also comprises an application in and running on the portable computing apparatus. The application is operative: to control input to the portable computing apparatus by the user of asset information for each of the distributed inanimate assets; and to convey the asset information input by the user to the remote computing apparatus.

The data processing arrangement further comprises a configurable data structure which is operative to determine what asset information is input by the user by way of the application and without the application being changed. More specifically, the configurable data structure may be operative to determine what asset information is input without changing the application per se, for example, without changing object code of the application. Nevertheless, the configurable data structure may be operative such that an effect of operation of the application is changed or the course of operation of the application is changed. This is in contrast to known approaches in which the application itself is changed to accommodate different information recordal requirements.

The remote computing apparatus is operative to change the configurable data structure from one use of the application to another to thereby change what asset information is input by way of the application in respect of at least one of the distributed inanimate assets. Changing the configurable data structure in the remote computing apparatus provides for ease of accommodating different information recordal requirements compared, for example, with changing the application in the remote computing apparatus and redeploying the application to the portable computing apparatus. The configurable data structure of the present invention may be configurable differently in respect of at least one attribute of each of the inanimate assets whereby different asset information can be input in respect of each of the inanimate assets. Alternatively or in addition, the configurable data structure of the present invention may be configurable differently in respect of an attribute of an inanimate asset from one use of the application to another.

The configurable data structure may be stored in the remote computing apparatus and configured therein. Configuration in the remote computing apparatus may be more convenient than configuration in the portable computing apparatus. Configuration of the configurable data structure may be in dependence on at least one of an asset register, a work management system, a document management system, and a control system. The application in the portable computing apparatus may cooperate with the configurable data structure by way of communication and more specifically reciprocal communication between the portable computing apparatus and the remote computing apparatus. The remotely stored configurable data structure may thus be operative to control the application whereby the application determines what asset information is input and perhaps also how the asset information is input to the portable computing apparatus. Such an approach may, for example, allow for a configuration change to be made in the remote computing apparatus and to the configuration change to be of effect in each of plural portable computing apparatus. Communication between the portable computing apparatus and the remote computing apparatus may be by way of a wide area communication network and may be by way of the Internet at least in part. The remote computing apparatus and the portable computing apparatus may be operative in accordance with the client-server model.

When configured, the configurable data structure may be conveyed from the remote computing apparatus to the portable computing apparatus, the received configurable data structure being operative in the portable computing apparatus to determine what asset information is input by the user. The configurable data structure may be operative to control input of asset information by controlling a graphical user interface (GUI) provided by the portable computing apparatus. The GUI may be controlled in respect of asset information solicited from the user by, for example, selection from a drop-down menu or entry of free text in response to a request for entry of asset information.

The data processing arrangement may be configured to convey a non-standalone application from the remote computing apparatus to the portable computing apparatus and the application comprised in the portable computing apparatus may be configured to run the received non-standalone application. The non-standalone application may be configured to run in dependence on the configurable data structure. The configurable data structure may be comprised at least in part in the non-standalone application. The non-standalone application may thus comprise data of structured form and procedures which invoke the structured data. The configurable data structure may be constituted by the data of structured form and the unchanging application is constituted by the procedures which invoke the structured data. When the non-standalone application has been conveyed to the portable computing apparatus, the non-standalone application may be operative to collate data without communication with the remote computing apparatus. At other times, there may communication between the portable computing apparatus and the remote computing apparatus when collated data is conveyed from the portable computing apparatus to the remote computing apparatus or when the remote computing apparatus conveys an instruction to the portable computing apparatus. An instruction from the remote computing apparatus may relate to management of data collation, such as a direction to the user of the portable computing apparatus to collate data from a particular asset.

Further to being comprised in part in the non-standalone application, the data of structured form may be comprised in a separate data structure. Where there is such partition of the data of structured form between the non-standalone application and the separate data structure, partition of the data of structured form may be in dependence on requirements. For example, data relating to particular assets may be comprised in the separate data structure and data common to or for common use in respect of plural assets may be comprised in the non-standalone application. Such an approach may provide for ease of management of asset information or change to the configurable data structure.

The configurable data structure may be configured in respect of a size of data to be input for an inanimate asset. The configurable data structure may be configured in respect of the number of data fields comprised in the configurable data structure. Each data field may correspond to a different attribute of an inanimate asset. The configurable data structure may therefore comprise plural data fields with each data field corresponding to a different attribute. Furthermore, a set of data fields for one inanimate asset may differ from a set of data fields for another inanimate asset. Such an approach provides for flexibility of use. For example, one data field may be applicable for a first inanimate asset and inapplicable for a second inanimate asset.

Where the configurable data structure comprises plural data fields, a first data field may be linked to at least one further data field whereby the at least one further data field is presented to the user for data input in dependence on the asset information input by a user in respect of the first data field. The input of asset information may therefore be conditional on earlier entered asset information. The configurable data structure may be configured to provide for different conditional input of asset information from one inanimate asset to another inanimate asset. Data fields in the configurable data structure may be tagged so as to provide for display in a predetermined fashion at the remote computing apparatus of asset information entered into the portable computing apparatus.

The remote computing apparatus may be operative to change a configuration of the configurable data structure, for example, for use with the portable computing apparatus after there has been a change in respect of inanimate assets for which data is to be collated. There may be a change in inanimate assets when at least one inanimate asset has aged such that its attributes have changed or when an inanimate asset is commissioned or removed from service. Alternatively, a previously configured configurable data structure may be reconfigured for use with portable computing apparatus different from the portable computing apparatus with which the previously configured data structure was used.

Following asset information input by the user being conveyed to the remote computing apparatus, the remote computing apparatus may be operative to analyse the asset information. Analysis may be in dependence on the configurable data structure. Analysis may provide for a check on quality of the asset information by, for example, comparing the form of the asset information with asset information expected to be input by way of the configurable data structure.

The application may be operative to provide a dialog box. The dialog box may be a web browser window. The dialog box may be displayed on a display surface of the portable computing apparatus, such as a display screen of a tablet computer. The dialog box may provide for reciprocal communication between the application and a user. The dialog box may comprise at least one user operable component, such as a clickable or touch sensitive area, which is operative to provide for entry of asset information and for control by a user.

The portable computing apparatus may comprise handheld computing apparatus, such as a tablet computer, a phablet or a smartphone. In a typical application, the data processing arrangement may comprise plural portable computing apparatus with each of the plural portable computing apparatus being operable as described above. Each of the plural portable computing apparatus may be operated by a respective user. The remote computing apparatus may comprise server apparatus. The server apparatus may have a distributed architecture. The remote computing apparatus may comprise a server application. Where communication is by way of the Internet the server application may comprise a web server. The portable computing apparatus may be configured to run a client application. Where communication is by way of the Internet the client application may comprise a web client. The client application may comprise the application, i.e. the asset information input application, described above.

Communication between the portable computing apparatus and the remote computing apparatus may be by way of at least one of: a computer network, such as the Internet or a dedicated communication link; and a metropolitan or wide area network, such as the Global System for Mobile Communications (GSM) network or 4G.

The distributed inanimate assets may be distributed installed assets and more specifically distributed installed assets of an infrastructure, such as are managed by a public utility.

The at least one attribute of the inanimate asset may comprise at least one of: a permanent attribute of the inanimate asset; and a changeable attribute of the inanimate asset. A permanent attribute may, for example, be a design characteristic. A permanent attribute may not be susceptible to change in the configurable data structure. A changeable attribute may, for example, reflect a condition of the inanimate asset or part thereof. A changeable attribute may be susceptible to change in the configurable data structure.

According to a second aspect of the present invention there is provided a method of collating information relating to distributed inanimate assets, the method comprising:
  running an application in a portable computing apparatus:
    to control input by a user to the portable computing apparatus of asset information for each of the distributed inanimate assets; and to convey the asset information input by the user to a remote computing apparatus, a configurable data structure being operative to determine what asset information is input by the user by way of the application and without the application being changed; and
  changing the configurable data structure in the remote computing apparatus from one use of the application to another to thereby change what asset information is input by the application in respect of at least one of the distributed inanimate assets.

Embodiments of the second aspect of the present invention may comprise one or more features of the first aspect of the present invention.

According to a third aspect of the present invention there is provided a computer program comprising program instructions for causing computer apparatus to perform the method according to the second aspect of the present invention. More specifically, the computer program may be at least one of: embodied on a record medium; embodied in read only memory; stored in a computer memory; and carried on an electrical carrier signal. The computer apparatus may comprise the remote computing apparatus and the portable computing apparatus. Further embodiments of the third aspect of the present invention may comprise one or more features of the first or second aspect of the present invention.

According to a fourth aspect of the present invention there is provided a computer system comprising program instructions for causing computer apparatus to perform the method according to the second aspect of the present invention. More specifically the program instructions may be at least one of: embodied on a record medium; embodied in a read only memory; stored in a computer memory; and carried on an electrical carrier signal. The computer apparatus may comprise the remote computing apparatus and the portable computing apparatus. Further embodiments of the fourth aspect of the present invention may comprise one or more features of the first or second aspect of the present invention.

According to a further aspect of the present invention there is provided a data processing arrangement for collating information relating to distributed inanimate assets, the data processing arrangement comprising: portable computing apparatus; remote computing apparatus; an application comprised in the portable computing apparatus and operative: to control input to the portable computing apparatus by a user of asset information relating to distributed inanimate assets; and to convey the asset information input by the user to the remote computing apparatus; and a data structure which is operative without changing the application to determine what asset information is input by the user by way of the application. Embodiments of the further aspect of the present invention may comprise one or more features of any previous aspect of the present invention.

According to a yet further aspect of the present invention there is provided a method of collating information relating to distributed inanimate assets, the method comprising: running an application in a portable computing apparatus: to control input by a user to the portable computing apparatus of asset information for each of the distributed inanimate assets; and to convey the asset information input by the user to a remote computing apparatus, a configurable data structure being operative to determine what asset information is input by the user by way of the application and without the application being changed.

Embodiments of the yet further aspect of the present invention may comprise one or more features of any previous aspect of the present invention.

BRIEF DESCRIPTION OF DRAWINGS

Further features and advantages of the present invention will become apparent from the following specific description, which is given by way of example only and with reference to the accompanying drawings, in which.

DESCRIPTION OF EMBODIMENTS

Figure 1:
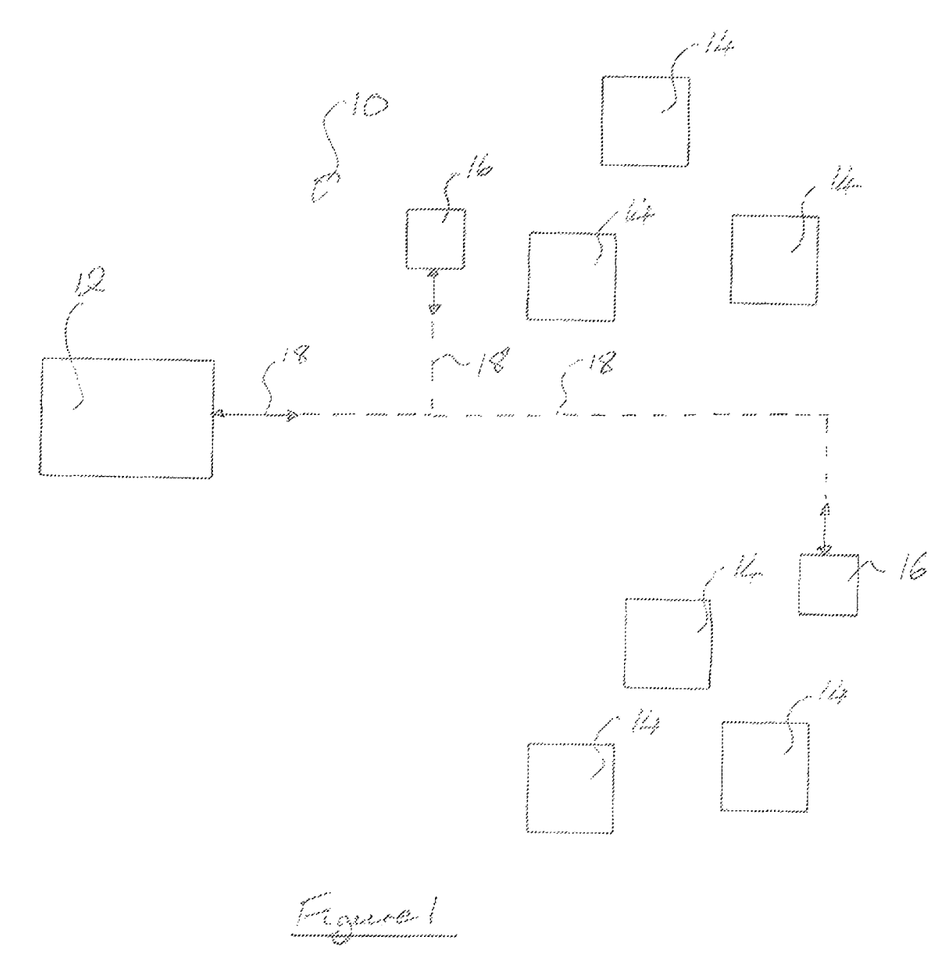
FIG. 1 is a block diagram representation of a data processing arrangement for collating information relating to distributed inanimate assets according to an embodiment of the present invention.

A data processing arrangement 10 according to an embodiment of the present invention is shown in block diagram form in FIG. 1. The data processing arrangement 10 comprises a server 12 (which constitutes remote computing apparatus) operated by an owner of distributed installed assets 14 of an infrastructure (which constitute distributed inanimate assets) or by a contracted organisation having responsibility for collation for the owner of information relating to the distributed installed assets. The distributed installed assets 14 may, for example, be owned or managed by a public utility such as an electricity supply company. The data processing arrangement 10 further comprises plural tablet computers 16. Each tablet computer 16 (which constitutes portable computing apparatus) is carried by a respective employee of the owner of the distributed installed assets or of the contracted organisation. Each employee has responsibility for collating information relating to a subset of the distributed installed assets 14 with each subset of the distributed installed assets having different information collation requirements from the other subsets of the distributed installed assets. Each employee therefore operates his tablet computer 16 to record information relating to the installed assets for which he has responsibility. Communication between the tablet computer 16 and the server 12 is by way of the Internet over wireless and wired media 18 in accordance with ordinary design practice in this respect. Communication between each tablet computer 16 and the server 12 is independent of communication between other tablet computers and the server.

Each tablet computer 16 runs a mobile application dedicated to the present purpose. The mobile application is in a programming language compatible with the operating system running on the tablet computer. Except as described herein, the mobile application is operative in accordance with standard design practice to run on the tablet computer 16 and to make use of assets of the tablet computer such as the display screen, microphone and camera. The mobile application is installed in each tablet computer 16 and is not changed irrespective of changing requirements for information collection in accordance with the present invention. As will become clear from the following description, changing requirements for information collection are attended to by way of a non-standalone application which is configured in the server 12. The server 12 is configured to run a server application dedicated to the present purpose. Except as described herein, the server application is operative in accordance with standard design practice to run on the server 12. The server application is in a programming language compatible with the operating system running on the server 12.

Figure 2A:
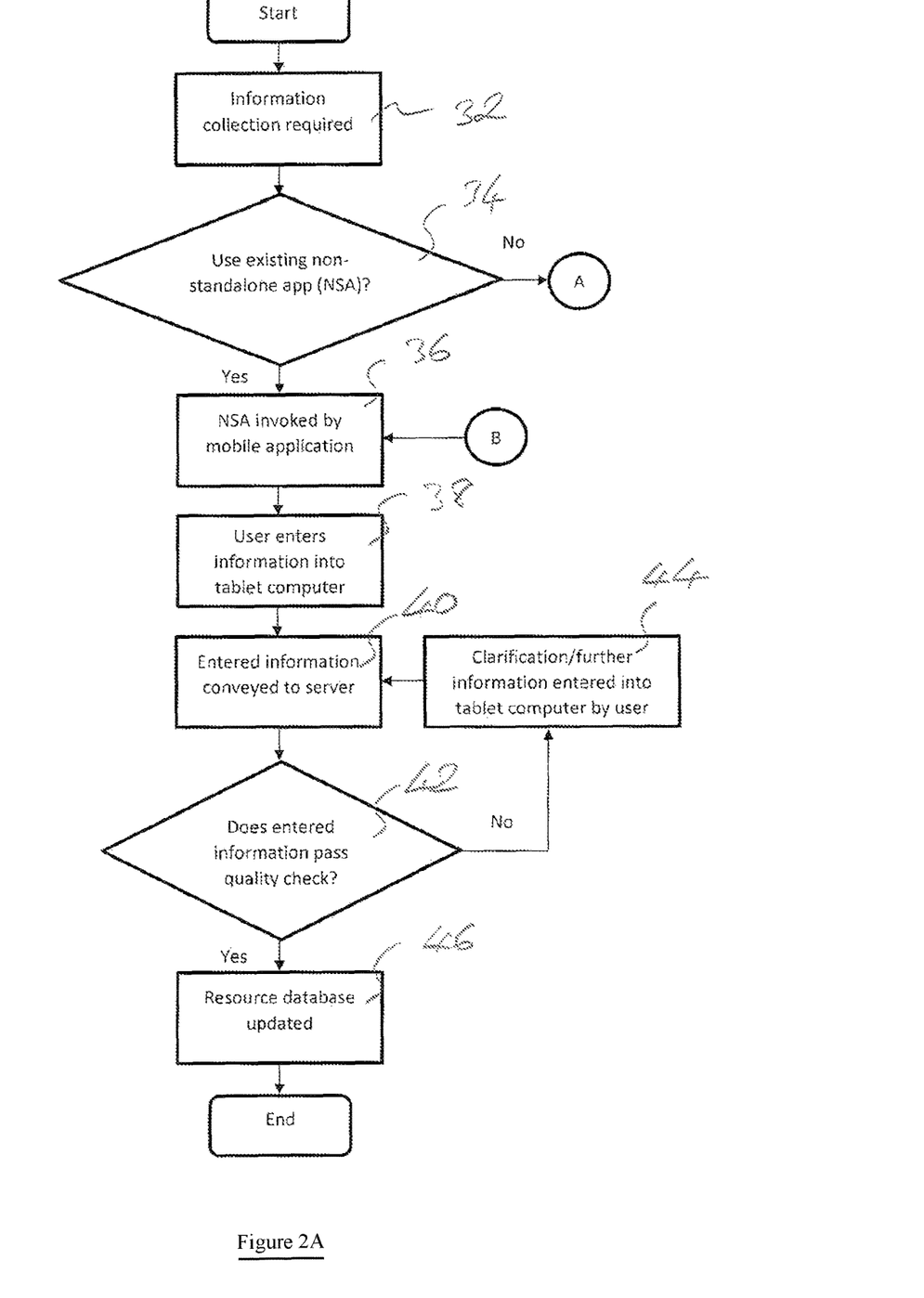
FIG. 2A is a flow chart representation of a method of collating information relating to distributed inanimate assets according to an embodiment of the present invention.
Figure 2B:
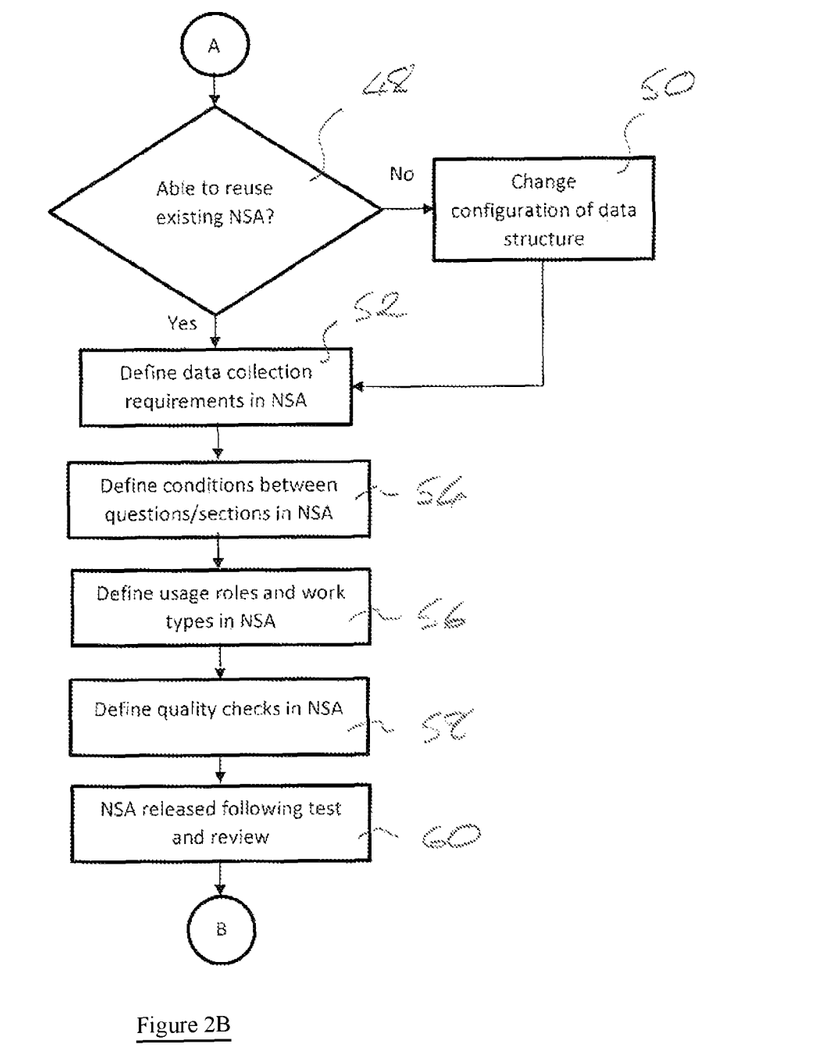
FIG. 2B is a branch portion of the flow chart in FIG. 2A.

A method of collating information relating to distributed inanimate assets according to the present invention will now be described with reference to FIG. 1 and the flow charts shown in FIGS. 2A and 2B.

When there is a fresh requirement for information collation 32, it is determined if the existing non-standalone application can be used 34. If so, the non-standalone application is invoked by the mobile application 36 whereby the user of the tablet computer enters information for at least one installed asset in dependence on operation of the mobile application as directed by the non-standalone application 38. When information for at least one installed asset has been entered, the mobile application is operative to provide for the entered information to be conveyed to the server 40. Thereafter quality checks are performed on the received information in the server 42. If the received information fails the quality checks, clarification or further information is sought from the user with the user entering the further information or making amendment to the already entered information by way of the mobile application 44. The further entered or amended information is then subject to quality checking in the server 42. Non-standalone applications provide a reference basis for quality checking in respect of specifying the form of quality checks to be performed. When the entered information passes quality checking an asset database is updated to take account of the information collated by way of the tablet computer 46. The asset database contains information collated previously in respect of the same and other installed assets by the present user and by other users each operating a respective tablet computer.

The installed assets of an infrastructure change over time on account of: ageing whereby attributes of assets change over time; introduction of new assets; and decommissioning of old assets. Furthermore, extent of collation of information differs at different time intervals. For example, full collation of information may be required annually and partial collation of information may be required quarterly. Such changing and differing information collation requirements give rise to the need for change in how the mobile application runs on each tablet computer with the non-standalone application providing for the change.

As described above, it is determined if the existing non-standalone application can be used 34. The existing non-standalone application is usable if it has been configured for a particular asset in respect of certain characteristics and the asset for which data collection is required is for the same asset and in respect of the same certain characteristics. If not, it is then determined if the existing non-standalone application can be reused 48. The existing non-standalone application is, for example, reusable if it has been configured for a particular asset or type of asset in respect of certain characteristics and the asset for which data collection is required is for the same asset or type of asset and in respect of different characteristics. By way of another example, the existing non-standalone application is reusable if the asset for which data collection is required is for the same asset in respect of the same characteristics but it is wished to change how data is presented to the user or how the user enters data during data collection. If the existing non-standalone application is capable of reuse, data collection requirements are defined in the non-standalone application 52. If the existing non-standalone application is incapable of reuse, the configuration of the data structure is changed 50 by either importing data structure elements from a library or configuring the data structure anew. The data structure is thus configured for a different asset or type of asset in respect of certain characteristics. For example, the different asset may be the like of a pump or a transformer and characteristics may comprise the like of: make, model and serial number, which are categorised as general attributes; optimum operating temperature and insulation medium, which are categorised as specific attributes; and rust condition, noisy operation, operating vibrations and operating temperature range, which are categorised as condition attributes. Thereafter, data collection requirements are defined in the non-standalone application 52.

Creation or reconfiguration of the non-standalone application in dependence on asset data will now be described. An Application Programming Interface (API) running on the server 12 provides for import of asset data from a primary asset database into a dynamic database structure having fields arranged into the three categories mentioned above, i.e. general, specific and condition attributes. The asset data and its conditions of acquisition and measurement possess metadata which is used to frame questions relating to the asset data by way of a dynamic non-standalone application generating application running on the server 12. Usually the set of asset data from which data for the non-standalone application is drawn is of greater size than is needed for a present data collation exercise. Therefore, only a subset of the set of asset data is used in the non-standalone application at any one time having regard to the purpose of data collation, for example, inspection of an existing asset, replacement of an asset, etc. Therefore, the same set of asset data is capable of being used in different ways by way of the non-standalone application with way of use changing over time as the purpose of data collation changes. Data in respect of assets is liable to change over time with data in the primary asset database being changed accordingly. By way of example, a new attribute in the form of an IP address for an asset may need to be taken into account. Where there is such a change in the primary asset database, the non-standalone application is reconfigured in dependence on the changed data in the primary asset database.

The primary asset database provides a ready means of configuring the non-standalone application. The primary asset database also provides for validation of collected data as otherwise described elsewhere herein. Validation comprises explicit validation which, for example, involves checking collated data against a list of allowed data. Validation further comprises multi-dimensional validation in which, for example, collated data is analysed to determine if the collated data comprises characteristics which belong to a predetermined number of allowed data permutations within the general and specific attributes categories. If the collated data does not belong to the predetermined number of allowed data permutations, the collated data is deemed invalid. There is further validation upon configuration of the non-standalone application in which data characteristics within the data structure are compared with each other to determine if data is valid. Validation upon configuration may, for example, comprise determining if installation date is later than a construction date.

Data collection requirements are defined by providing for: provision of prompts and directions to the user; sequencing of individual data items and groups of data items to be followed during entry of information into the tablet computer; and removal of individual data items and groups of data items which are not required. Data collection requirements are further defined in respect of how information is entered, for example, by way of date and/or time picker, drop down list, check box, radio button, slider and the like. Data collection requirements are yet further defined in respect of information entry, for example, by way of GPS stamp, timestamp, photograph capture, barcode capture and the like. Conditions between questions and sections are defined in the non-standalone application 54. Conditions are defined by providing conditional linkage between questions or sections whereby flow is to a particular question or section in dependence on the nature of information entered, for example, answering yes or no to a question. Usage roles and work types are defined in the non-standalone application 56. Usage roles and work types are defined, for example, in respect of: determining extent of data collection depending on the role of the intended user; and the nature of the assets for which information is to be collated, such as newly installed assets only or end of life assets only. Quality checks are defined in the non-standalone application 58. Defining quality checks involves determining if entered information conforms to predetermined expectations. For example, a data field may require entry of data of a minimum length. Following test and review the non-standalone application is released 60 whereby it is ready to be invoked by the mobile application 36.

The invention claimed is:

1. A data processing arrangement for collating information relating to distributed installed assets belonging to a public utility such as an electricity generator or supplier, the data processing arrangement comprising:
   plural hand-held computing apparatuses each operable by a respective one of plural users, wherein each of the plural hand-held computing apparatuses is a tablet computer, a phablet or a smartphone;
   a server;
   a mobile application running on each of the plural hand-held computing apparatuses, each mobile application is configured: to control input by the user of asset information for each of plural distributed installed assets into the hand-held computing apparatus; and to convey the asset information input by the user to the server; and
   plural configurable data structures, each of the plural configurable data structures stored in a respective one of the plural hand-held computing apparatuses, the configurable data structure containing asset data identifying the plural distributed installed assets and comprising at least one attribute of each of the identified plural distributed installed assets, wherein
   each mobile application is configured to access the respective configurable data structure whereby the asset data contained in the accessed configurable data structure directs control by the mobile application of input of asset information into the respective hand-held computing apparatus, and
   the server is configured to change the asset data contained in each configurable data structure from one input into the respective hand-held computing apparatus of asset information for each of plural distributed installed assets to another input into the respective hand-held computing apparatus of asset information for each of plural distributed installed assets to thereby change how control of input of asset information into the respective hand-held computing apparatus by the mobile application is directed by the asset data and without object code of the mobile application being changed.

2. The data processing arrangement according to claim 1 wherein the server comprises an asset database storing asset information conveyed from the plural hand-held computing apparatuses.

3. The data processing arrangement according to claim 1 wherein the server is configured to change the asset data contained in each configurable data structure in the server, and the data processing arrangement is configured to convey the configurable data structure with the thus changed asset data from the server to the respective hand-held computing apparatus.

4. The data processing arrangement according to claim 3 further configured to convey an application from the server to each hand-held computing apparatus, wherein the respective mobile application is configured to invoke the application, and the application is configured to access the configurable data structure conveyed to the hand-held computing apparatus when the application is invoked by the respective mobile application, whereby under direction by the asset data contained in the accessed configurable data structure the application and the mobile application control input by the user of asset information into the respective hand-held computing apparatus.

5. The data processing arrangement according to claim 4 wherein the application invoked by the mobile application is configured to control with the mobile application input of asset information without communication with the server.

6. The data processing arrangement according to claim 4 wherein each configurable data structure comprises data of structured form and the respective application comprises procedures, and each configurable data structure is comprised in the respective application whereby the respective application comprises the data of structured form and the procedures, the procedures configured to access the data of structured form.

7. The data processing arrangement according to claim 6 further comprising a further configurable data structure apart from the configurable data structure comprised in the respective application, wherein asset data relating to individual assets is contained in the further configurable data structure and asset data common to or for common use in respect of plural assets is contained in the configurable data structure.

8. The data processing arrangement according to claim 1 wherein each configurable data structure comprises plural data fields, each data field containing a different attribute of an installed asset.

9. The data processing arrangement according to claim 8 wherein asset information is input by the user under direction by content of a first data field of the plural data fields, and the first data field is linked to at least two further data fields of the plural data fields whereby one of the at least two further data fields is selected to direct control of input of further asset information, wherein such selection is dependent on the asset information input by the user under direction by content of the first data field.

10. The data processing arrangement according to claim 1 wherein, following asset information input by the user being conveyed to the server by the mobile application, the server is configured to analyse the conveyed asset information, analysis of the conveyed asset information comprising comparing a form of the conveyed asset information with a reference form of asset information stored in the server, the reference form of asset information constituting a form of asset data expected to be input by the user when under direction by the asset data contained in the configurable data structure stored in the hand-held computing apparatus.

11. The data processing arrangement according to claim 4, wherein each configurable data structure comprises plural data fields, each data field containing a different attribute of an installed asset, wherein asset information is input by the user under direction by content of a first data field of the plural data fields, and the first data field is linked to at least two further data fields of the plural data fields whereby one of the at least two further data fields is selected to direct control of input of further asset information, such selection depending on the asset information input by the user under direction by content of the first data field, and wherein the application is configured to link the first data field to the at least two further data fields and to select one of the at least two further data fields depending on the asset information input by the user under direction by content of the first data field.

12. The data processing arrangement according to claim 4, wherein the application comprises at least one procedure which controls at least one of: directions given to the user by a user interface during input of asset information, the user interface comprised in the hand-held computer apparatus; sequence of asset information input into the hand-held computer apparatus; selection of one of plural forms of user interface provided by the hand-held computer apparatus for input of asset information; and addition of hand-held computer apparatus generated data to the asset information input by the user.

13. The data processing arrangement according to claim 4, wherein the application comprises a procedure which is configured to control addition of hand-held computer apparatus generated data to the asset information input by the user, the hand-held computer apparatus generated data comprising at least one of: GPS data; a timestamp; a photograph acquired by the hand-held computer apparatus; and a barcode read by the hand-held computer apparatus.

14. The data processing arrangement according to claim 1, wherein the mobile application is configured: to cooperate with an operating system of the hand-held computer apparatus when the mobile application runs; and to control during input of asset information by the user at least one of a display, a microphone, and a camera of the hand-held computer apparatus.

15. A method of collating information relating to distributed installed assets belonging to a public utility such as an electricity generator or supplier, the method comprising:
running a mobile application on each of plural hand-held computing apparatuses operable by a respective one of plural users: to control input by the respective user of asset information for each of plural distributed installed assets into the hand-held computing apparatus; and to convey the asset information input by the user to a server, each mobile application assessing asset data contained in a respective configurable data structure whereby the accessed asset data directs control by the mobile application of input of asset information into the respective hand-held computing apparatus, wherein the asset data identifies the plural distributed installed assets and comprises at least one attribute of each of the identified plural distributed installed assets, each configurable data structure is stored in the respective hand-held computing apparatus, and each of the plural hand-held computing apparatuses is a tablet computer, a phablet or a smartphone; and
changing in the server the asset data contained in each configurable data structure from one input into the respective hand-held computing apparatus of asset information for each of plural distributed installed assets to another input into the respective hand-held computing apparatus of asset information for each of plural distributed installed assets to thereby change how control of input of asset information into the respective hand-held computing apparatus by the mobile application is directed by the asset data and without object code of the mobile application being changed.

16. A computer program comprising program instructions for causing plural hand-held computer apparatuses and a server to perform the method according to claim 15.

17. The computer program according to claim 16 being at least one of: embodied on a record medium; embodied in read only memory; and stored in a computer memory.

* * * * *